United States Patent Office 2,772,140
Patented Nov. 27, 1956

2,772,140

TANNING AGENT COMPRISING PHENOL DERIVATIVES OF WASTE SULPHITE LIQUOR AND METHOD OF PREPARING SAME

Harry Borden Marshall and Mary Krizsan, Toronto, Ontario, Canada, assignors to Ontario Research Foundation, Toronto, Ontario, Canada No Drawing. Application July 16, 1952,
Serial No. 299,278

6 Claims. (Cl. 8—94.31)

This invention relates to a new and improved method for the preparation of phenol derivatives of waste sulphite liquor.

The condensation of phenols with various forms of isolated lignin, or with lignin as it exists in the wood, is well known. The reaction takes place readily in the dry state in the presence of an acid catalyst, for example, hydrochloric acid, and at a temperature of 150° C. or higher. In addition a process has been described in U. S. Patent No. 2,385,586, granted September 25, 1945, to H. Rudy et al. and entitled "Condensation of Phenols with Sulphite Waste Liquor," for the condensation of phenols with waste sulphite liquor in the presence of relatively high ratios of phosphoric acid (4–67% of the waste sulphite liquor solids). These methods have in common the disadvantage that they require an acid catalyst which causes the lignin to become less reactive and less suitable for many uses. Furthermore, it is often difficult, if not impossible, to remove the acid catalyst from the reaction mixture where its presence is frequently undesirable.

Our invention relates to the condensation of waste sulphite liquor with phenols in the absence of a catalyst and at a relatively low temperature, thus eliminating the disadvantages of previous methods. We have found that waste sulphite liquor, if first passed through a cation exchange column to remove calcium ions, or any other cations which may be present, will then condense with phenols under relatively mild conditions, for example even by refluxing a solution of the phenol in decalcified waste sulphite liquor for several hours. The condensation reaction has been found to depend upon a number of factors and in particular on time, temperature, concentration, and ratio of phenol to decationized waste sulphite liquor solids. Thus it is possible, by suitable adjustment of the reaction conditions, to obtain a wide variety of condensation products which differ with respect to the amount of phenol that is condensed with the waste sulphite liquor solids. It is also possible to vary the properties of the condensation product within wide limits by condensing waste sulphite liquor with other phenols such as cresol, catechol, resorcinol, hydroquinone, pyrogallol, B-naphthol, vanillin, salicylic acid, or by using mixtures of different phenols. The choice of these conditions and of the phenol will depend on the properties desired in the condensation product and thus upon the application for which it is to be used.

Our preferred conditions for carrying out this reaction are in the temperature range of 100–150° C. in a sealed acid-resisting autoclave equipped with a mechanical stirrer. The reaction may be carried out at lower temperatures but requires considerably longer reaction periods. At temperatures in excess of 150° C., the reaction proceeds very rapidly and is therefore more difficult to control.

Because of the large number of variables associated with this reaction, it is not possible to state precisely the time required to produce a condensation product with optimum properties for a specific application. This is most readily determined by experimentation and may vary from 30 minutes to 12 hours, depending upon the other conditions employed.

The concentration of the decationized waste sulphite liquor is also a very important variable. It is apparent that prior evaporation of the waste sulphite liquor will increase the rate of reaction with the phenol and this must be taken into consideration when attempting to prepare a specific condensation product. Although the condensation reaction will take place over a wide range of concentrations of the decalcified waste sulphite liquor, we prefer to operate in the range of 10–50% solids by volume, 10% being the minimum concentration at which waste sulphite liquor is normally discharged from a sulphite mill, and 50% being the maximum concentration at which waste sulphite liquor solution can be readily stirred in the reactor.

The reaction between a phenol and decationized waste sulphite liquor does not go to completion even under relatively severe reaction conditions. It is therefore necessary to use a somewhat higher ratio of phenol to decationized waste sulphite liquor solids than that required in the final condensation product. The amount of excess phenol used is an important factor in determining the time necessary to obtain the required degree of phenolation (the number of grams of phenol condensed with 100 grams of waste sulphite liquor solids). It will be apparent that the amount of excess phenol may be varied over very wide limits, but we prefer to use an excess of not more than 200%. The presence of excess unreacted phenol in the condensation product is undesirable for most applications and may be readily removed and thus recovered for further use by extraction with a suitable organic solvent, or by high vacuum distillation of the residue obtained on evaporating the reaction product to dryness.

The degree of phenolation of the condensation product may be estimated from the difference between the amount of phenol added and the amount of phenol recovered. It may also be determined from the reduction in methoxyl content of the decationized waste sulphite liquor during the condensation process.

The removal of cations from the waste sulphite liquor may be accomplished by any known method, for example, by using any of the commercial cation exchange resins operating on the hydrogen cycle, or even by using a cation exchange resin prepared from waste sulphite liquor. One of the resins we have used is Amberlite IR–120 supplied by the Rohm and Haas Company, Philadelphia, Pa., which is a cation exchange resin, the composition of which is unknown. These resins are usually regenerated by the use of dilute mineral acids but for purposes of economy we prefer to use a solution of sulphur dioxide in water. The latter is readily available at the sulphite mill producing the waste sulphite liquor and the eluate from the regeneration cycle, containing calcium sulphite and sulphur dioxide, may be returned to the sulphite mill for reuse in making up fresh cooking acid.

It will be shown later on that the degree of phenolation depends upon the extent to which the cations are removed, and thus the properties of the ultimate condensation product will vary as the cations are more or less removed. The present invention contemplates not only the complete removal of the cations, but also their partial removal, the extent to which they are removed being dictated by such considerations as the desired properties of the condensation product, and such practical considerations as time, expense and efficiency of removal of the cations. Thus it is to be understood that when "removing the cations" is specified elsewhere in this specification and in the appended claims, both complete and partial removal is contemplated, and is to be understood.

We have found that the condensation products of decationized waste sulphite liquor with various phenols are particularly satisfactory tanning agents. Waste sulphite liquor is used to a limited extent as an extender for the natural tannins, and as a bleaching and filling agent, but it cannot be considered a true tanning agent since, when used alone, it produces empty leathers with poor hydrothermal stability. We have found that these objections to waste sulphite liquor can be overcome if the waste sulphite liquor is first condensed with a phenol by our new process described above. These condensation products are true tanning agents since they produce soft, flexible leathers comparable in hydrothermal stability and yield to leathers prepared from the natural tannins. Thus they may be used as tanning agents without supplementation with natural tannin extracts. Their properties may be varied within very wide limits by varying the amount of the phenol condensed with the waste sulphite liquor, by condensing waste sulphite liquor with mixtures of different phenols, or by using mixtures of different condensation products. They are also compatible with the natural tannins and if desired may be blended with them in various ways and in various amounts to produce a tanning agent with specific requirements. They have the additional advantage of being essentially ash-free and this advantage may be retained if ammonia is used to partially neutralize them to the pH required by the tanner.

In general we have found that the tanning properties of these phenolic derivatives of decationized waste sulphite liquor are improved in direct proportion to the amount of combined phenol, that is in proportion to the degree of phenolation. However, as the degree of phenolation is increased, the condensation product becomes less soluble in water and eventually a point is reached at which insoluble colloidal particles begin to form. It is therefore desirable to interrupt the condensation reaction at this point since it represents the maximum degree of phenolation obtainable in a water soluble product. The presence of a small amount of colloidally dispersed material is not disadvantageous and, in fact, actually appears to improve the properties of the resulting leather. If this optimum reaction time is exceeded, insoluble condensation products are formed. These materials can be dissolved in other solvents, such as aqueous acetone, or they may be rendered soluble in water by sulphonation treatments, and such procedures are within the scope of this invention, but we prefer to prevent the formation of insoluble condensation products by suitable control of the reaction variables.

In general the tanning properties of the phenolic condensates improve with increasing hydroxyl content of the phenol. However, for economic reasons, we prefer to use the condensate prepared by reacting phenol (monohydroxy benzene) with decalcified waste sulphite liquor. By continuing the condensation reaction to the point where a colloidal precipitate just begins to form, a highly satisfactory tanning agent can be prepared.

Waste byproduct phenols may also be used to advantage, for example the crude phenolic mixture discarded from the caustic scrubbers of a petroleum refinery. This waste material consists essentially of mixed cresols and may be purified prior to condensation with decationized waste sulphite liquor by any suitable method such as extraction with sodium bicarbonate or basic lead acetate solution and/or by distillation. The condensation products prepared from such materials have tanning properties comparable to those of the condensation product prepared from phenol.

The following description of experiments which have been performed by us will serve to illustrate the application of our invention. It is to be understood that our invention is not limited to the materials and conditions described in these experiments which are to be considered as examples only. In the majority of experiments the waste sulphite liquor was obtained from a plant using the calcium base process but sodium, ammonium or magnesium base waste sulphite liquors are equally satisfactory. If the presence of sugars in the condensation product is undesirable they may be removed by fermentation or other treatments prior to the decationization step. The process is equally applicable to purified or precipitated fractions of ligninsulphonates derived from waste sulphite liquor.

*Example 1.—Illustrating the effect of decationization on the condensation of waste sulphite liquor with phenol*

Waste sulphite liquor discharged from a mill producing a newsprint grade of sulphite pulp was found to contain 13.0% calcium (calculated as CaO, based on the solids present in the liquor). It was completely freed of cations by passing through a column containing an excess of a cation-exchange resin operated on the hydrogen cycle (Amberlite IR-120 supplied by the Rohm and Haas Company). The resulting effluent was then evaporated under reduced pressure to a solids content of 100 grams per 200 millilitres.

200 millilitres of the concentrated effluent, containing 100 grams of decationized waste sulphite liquor solids, was mixed with 50 grams of phenol and the resulting solution heated under reflux for 3 hours. The reaction mixture was cooled and then extracted exhaustively with petroleum ether (30°–50° C.) to remove unreacted phenol. The weight of unreacted phenol, recovered by evaporation of the solvent extracts, was 38.7 grams indicating that 11.3 grams of phenol had condensed with the waste sulphite liquor solids. The extracted phenol-free condensation product was a dark brown solution containing 111.3 grams total solids. Since only 100 grams of waste sulphite liquor solids were used in the reaction, the condensation product had a degree of phenolation of 11.3.

In order to determine the effect of partial removal of calcium from waste sulphite liquor on its ability to condense with phenol, a series of samples of waste sulphite liquor with varying calcium content was prepared by adding calcium oxide in varying amounts to 200 millilitre portions of concentrated decationized waste sulphite liquor containing 100 grams of total solids as in the previous experiment. Each solution was then condensed with 50 grams of phenol by heating for 3 hours under reflux. The reaction products were analysed for total solids after extraction of unreacted phenol with petroleum ether. The results of these condensations are given in Table I.

TABLE I

| Calcium Content of Waste Sulphite Liquor (calculated as percent CaO on total solids) | Degree of Phenolation (phenol added less phenol recovered) |
|---|---|
| 0 | 11.3 |
| 1.63 | 11.7 |
| 3.25 | 8.8 |
| 6.50 | 0.1 |
| 13.0 | nil |

These results show that waste sulphite liquor does not condense with phenol in the absence of an acid catalyst. They further show that condensation with phenol will take place if cations are removed from waste sulphite liquor, the degree of phenolation depending upon the extent to which they are removed.

*Example 2.—Illustrating the condensation of decationized waste sulphite liquor with phenol under reflux conditions*

Waste sulphite liquor was completely freed of cations as described in Example 1. The resulting effluent was concentrated to a total solids content of 30 grams per 100 millilitres. 333 millilitres of the concentrated effluent containing 100 grams total solids was mixed with 100 grams phenol and refluxed for 4 hours. The mixture was then cooled and the unreacted phenol recovered by exhaustive extraction with petroleum ether as described in Example 1. The condensed or reacted phenol was determined by difference. The experiment was repeated using reflux periods of 8 and 12 hours respectively. The results obtained are given in Table II.

TABLE II

| Reflux Time (Hours) | Degree of Phenolation (weight of phenol combined with 100 grams waste sulphite liquor solids) |
|---|---|
| 4 | 6.3 |
| 8 | 11.2 |
| 12 | 19.4 |

These experiments show that the condensation reaction will take place under relatively mild conditions and that the degree of phenolation increases progressively with time.

*Example 3.—Illustrating the condensation of decationized waste sulphite liquor with phenol under pressure*

Waste sulphite liquor, which had been rendered ash-free by treatment with a cation-exchange resin operating on the hydrogen cycle, and which had a methoxyl content based on dry solids of 9.57%, was evaporated under reduced pressure to a concentration of 35 grams per 100 millilitres. 214 millilitres of this solution, containing 75 grams dry solids, were treated with 75 grams phenol and the resulting solution sealed in a glass tube and heated for 2 hours at 125° C. The reaction mixture was then exhaustively extracted with petroleum ether to recover unreacted phenol as in previous examples. The residual solution was filtered to remove a small quantity of insoluble material and then analysed for total solids. The solids were also analysed for methoxyl content to determine the amount of phenol which had condensed with the waste sulphite liquor solids.

The experiment was repeated with reaction times of 4 and 6 hours. The results of these experiments are given in Table III.

TABLE III

| Time (hours) | 2 | 4 | 6 |
|---|---|---|---|
| Insoluble Condensation Product (grams) | 3.2 | 7.3 | 5.8 |
| Soluble Condensation Product (grams) | 86.6 | 86.8 | 87.1 |
| Combined Phenol (grams) | 18.9 | 19.8 | 26.4 |
| Methoxyl Content of Soluble Condensation Product | 7.79 | 7.44 | 7.16 |
| Degree of Phenolation (calculated from Reduction in Methoxyl Content of Waste Sulphite Liquor Solids) | 22.3 | 28.6 | 33.6 |

These results show that the condensation of phenol with decationized waste sulphite liquor takes place much more rapidly at higher temperatures and that condensation products with relatively high phenol contents may be prepared in a relatively short time.

*Example 4.—Illustrating the condensation of decationized waste sulphite liquor with phenol by the distillation method*

4 litres of decalcified ash-free waste sulphite liquor, containing 628 grams total solids, was mixed with 314 grams phenol and the resulting solution evaporated to dryness under reduced pressure. The residue was heated under reduced pressure in a boiling water bath until the unreacted phenol had distilled over and was recovered. The resulting condensation product was completely soluble in water and was obtained in a yield of 725 grams. The degree of phenolation, calculated from the increase in yield, was 15.4%.

*Example 5.—Illustrating the condensation of decationized waste sulphite liquor with a crude phenolic mixture*

A mixture of waste phenols, obtained as a byproduct from the caustic scrubbers of a petroleum refinery, was acidified with sulphuric acid and the phenolic oil distilled at atmospheric pressure without fractionation. The distillate consisted essentially of a mixture of cresols. 100 grams of distillate was added to 200 millilitres decationized waste sulphite liquor containing 100 grams dry solids and the mixture sealed in a glass tube and heated for 4 hours at 125° C. The reaction product was then extracted exhaustively with a mixture of ether-petroleum ether (1:1) to remove unreacted phenols. The residual solution was filtered to remove a small quantity of insoluble material and then analysed for total solids and methoxyl content. The yield of condensation product was 123.8 grams and the degree of phenolation, calculated from the reduction in methoxyl content (9.72% to 7.0%), was 39.0%.

*Example 6.—Illustrating the condensation of decationized waste sulphite liquor with resorcinol*

294 millilitres decationized waste sulphite liquor containing 100 grams dry solids and 75 grams resorcinol were heated in a sealed glass tube for 4 hours at 125° C. The resulting bright red reaction mixture was extracted exhaustively with a mixture of ether-petroleum ether (1:1) to remove unreacted resorcinol. The aqueous portion was then filtered to remove a small quantity of insoluble material (0.5 gram) and analysed for total solids and methoxyl content. The yield of condensation product was 137.2 grams and the degree of phenolation, calculated from the reduction in methoxyl content (9.35% to 6.59%), was 41.8%.

Similar condensation products were prepared by reacting decationized waste sulphite liquor with cresol, vanillin, salicylic acid, hydroquinone, catechol, pyrogallol, phloroclucinol, bisphenol S and B-naphthol respectively.

*Example 7.—Illustrating the condensation of high molecular ligninsulphonic acid with phenol*

Waste sulphite liquor was placed in a cellophane membrane and allowed to dialyse into a large bath of distilled water until completely free of sugars. The resulting high molecular calcium ligninsulphonate was converted to the free acid by treatment with Amberlite IR-120 operating on the hydrogen cycle and then evaporated under reduced pressure to a solids content of 30%. 254 millilitres of concentrated high molecular ligninsulphonic acid, containing 75 grams total solids, was mixed with 75 grams phenol and then sealed in a glass tube and heated for 4 hours at 125° C. The reaction mixture, after exhaustive extraction with petroleum ether to remove unreacted phenol, was a dark brown solution containing 82.9 grams total solids. No insoluble condensation product was obtained. The degree of phenolation, calculated from the reduction in methoxyl content (13.33% to 11.25%) was 18.7%.

*Example 8.—Illustrating the tanning properties of condensation products of decationized waste sulphite liquor with various phenols*

Small pieces of pickled cowhide grain split (4 inches by 6 inches) were depickled and brought to a pH of 5 using an acetate buffer solution. They were then tanned with the phenolic derivatives of waste sulphite liquor in the following manner. The hide sample was gently agitated for 16 hours in 200 millilitres of a 2% tannin solution[1] which had been previously adjusted to a pH of 5 with sodium hydroxide. It was then transferred to 100 millilitres of a 5% tannin solution,[1] previously adjusted to a pH of 3.5 with sodium hydroxide, and agitated for a further 22 hours. During the latter period, lactic acid was added at frequent intervals to re-adjust the pH of the solution to 3.5. The resulting leather was washed with water, bleached with dilute sulphuric acid, and washed again. It was then tacked firmly to a wooden board and allowed to dry slowly. The properties of the leathers are given in Table IV.

TABLE IV

| Tanning Material | Colour of Leather | Shrinkage Temperature of Leather (° C.)[1] | Leather Yield grams per 100 grams original hide substance |
|---|---|---|---|
| A. Decationized waste sulphite liquor. | light brown, uneven | 68 | 168 |
| B. Phenol-decationized waste sulphite liquor condensate. | gray | 76 | 174 |
| C. 75% B, 25% quebracho. | light reddish brown. | 80 | 179 |
| D. 50% B, 50% quebracho. | do | 83 | 215 |
| E. Quebracho | medium reddish brown. | 80 | 217 |
| F. Resorcinol-decationized waste sulphite liquor condensate. | light reddish brown. | 83 | 189 |
| G. Catechol - decationized waste sulphite liquor condensate. | medium bluish brown. | 77 | 189 |
| H. Pyrogallol-decationized waste sulphite liquor condensate. | dark reddish brown. | 74 | 172 |

[1] The original hide used in these experiments had a shrinkage temperature of 63° C.

In another experiment small pieces of acetone-dehydrated cowhide grain split (4 inches by 4 inches) were rehydrated at a pH of 5.0 in an acetate buffer solution and then tanned with various condensation products of decationized waste sulphite liquor using a procedure similar to that described above. After washing and bleaching they were oiled with equal amounts of neat's-foot oil, then tacked out and allowed to dry slowly. After drying they were sammed, staked, tacked out and dried again. Finally they were staked in the dry condition. The hydrothermal stability of the resulting leathers, as measured by their shrinkage temperatures, are given in Table V.

TABLE V

| Tanning Material | Shrinkage Temperature (°C.)[1] | Properties of Leather |
|---|---|---|
| Decationized waste sulphite liquor | 70 | thin, hard and stiff. |
| Phenol-decationized waste sulphite liquor condensate | 82 | soft, flexible. |
| Mixed cresols[2] decationized waste sulphite liquor condensate | 85 | moderately soft, flexible. |
| Quebracho | 89 | soft, flexible. |

[1] The original hide used in these experiments had a shrinkage temperature of 66° C.
[2] The mixed cresols were obtained from the caustic scrubber of a petroleum refinery.

These results show that the tanning properties of decationized waste sulphite liquor were greatly improved by condensation with various phenols in the manner described above. Blends of these condensation products with quebracho effect a further improvement in tanning by increasing the hydrothermal stability and yield of the resulting leather.

When, in this specification, we use the expression "decationized" we mean the removal of metallic cations and do not refer to the removal of hydrogen ions.

What we claim as our invention is:

1. A process for the production of useful substances from waste sulphite liquors which consists of removing the cations from the waste sulphite liquor by treatment with an ion exchange resin, heating decationized waste sulphite liquor to a temperature of between 100° C. and 150° C. with an excess of a phenol, said phenol being selected from the group comprising monohydric, dihydric and trihydric phenols and combinations thereof, and removing the excess phenol.

2. A process for the production of useful substances from ligninsulphonate compounds which consists of removing the cations from the ligninsulphonate by treatment with an ion exchange resin, heating the decationized ligninsulphonate to a temperature of between 100° C. and 150° C. with an excess of a phenol, said phenol being selected from the group comprising monohydric, dihydric and trihydric phenols and combinations thereof, and removing the excess phenol.

3. A process for the production of useful substances from waste sulphite liquors which consists of removing sufficient cations from the waste sulphite liquor by treatment with an ion exchange resin that the proportion of CaO to total solids is less than 3 to 100, heating the decationized waste sulphite liquor to a temperature of between 100° C. and 150° C. with an excess of a phenol, said phenol being selected from the group comprising monohydric, dihydric and trihydric phenols and combinations thereof, and removing the excess phenol.

4. A useful product derived from waste sulphite liquor by removing the cations from the waste sulphite liquor by treatment with an ion exchange resin, heating the decationized waste sulphite liquor to a temperature of between 100° C. and 150° C. with an excess of a phenol, said phenol being selected from the group comprising monohydric, dihydric and trihydric phenols and combinations thereof, and removing the excess phenol.

5. A useful product derived from ligninsulphonate compounds by removing the cations from the ligninsulphonate by treatment with an ion exchange resin, heating the decationized ligninsulphonate to a temperature of between 100° C. and 150° C. with an excess of a phenol, said phenol being selected from the group comprising monohydric, dihydric and trihydric phenols and combinations thereof, and removing the excess phenol.

6. A tanning agent consisting of a combination of natural tannins and a compound derived from waste sulphite liquor by removing the cations from the waste sulphite liquor by treatment with an ion exchange resin, heating the decationized waste sulphite liquor to a temperature of between 100° C. and 150° C. with an excess of a phenol, said phenol being selected from the group comprising monohydric, dihydric and trihydric phenols and combinations thereof, and removing the excess phenol.

References Cited in the file of this patent

UNITED STATES PATENTS

| 1,539,517 | Schmidt | May 26, 1925 |
| 2,148,893 | Bauer | Feb. 28, 1939 |
| 2,385,586 | Rudy et al. | Sept. 25, 1945 |

FOREIGN PATENTS

| 519,848 | Great Britain | Apr. 8, 1940 |

[1] Based on the percentage tannins in the condensation product which were determined as the percentage absorbed by an excess of hide powder in 16 hours at room temperature.